United States Patent
Li et al.

(10) Patent No.: US 10,116,125 B2
(45) Date of Patent: Oct. 30, 2018

(54) COLD SHRINKABLE TERMINATION, COLD SHRINKABLE TERMINATION ASSEMBLY AND METHOD FOR MANUFACTURING THE SAME

(71) Applicant: Tyco Electronics (Shanghai) Co. Ltd., Shanghai (CN)

(72) Inventors: Yugang Li, Shanghai (CN); Lizhang Yang, Shanghai (CN); Haowei Yang, Shanghai (CN); Peng Li, Shanghai (CN); Song Xue, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 103 days.

(21) Appl. No.: 14/813,869

(22) Filed: Jul. 30, 2015

(65) Prior Publication Data

US 2016/0036213 A1 Feb. 4, 2016

(30) Foreign Application Priority Data

Jul. 31, 2014 (CN) .......................... 2014 1 0372780

(51) Int. Cl.
*H02G 15/02* (2006.01)
*H02G 15/08* (2006.01)
(Continued)

(52) U.S. Cl.
CPC .............. *H02G 1/14* (2013.01); *H02G 15/046* (2013.01); *H02G 15/068* (2013.01)

(58) Field of Classification Search
CPC ... H01B 3/28; H01B 3/46; H01B 7/22; H01B 9/02; H02G 1/14; H02G 15/02;
(Continued)

(56) References Cited

U.S. PATENT DOCUMENTS

| 4,378,463 A | * | 3/1983 | Senior | .................. C08L 71/03 |
| | | | | 174/73.1 |
| 4,383,131 A | * | 5/1983 | Clabburn | .............. H02G 15/10 |
| | | | | 156/49 |
| 2014/0287175 A1 | * | 9/2014 | Krawiec | ................ H01B 3/46 |
| | | | | 428/36.4 |

FOREIGN PATENT DOCUMENTS

CN 202026070 U * 11/2011
WO WO 2014057381 A1 * 4/2014 ........... H02G 15/046

OTHER PUBLICATIONS

Inertia Repl Medium Voltage Joint Catalog_p. 1-4_Jan. 2009.*

* cited by examiner

*Primary Examiner* — Timothy Thompson
*Assistant Examiner* — Guillermo Egoavil
(74) *Attorney, Agent, or Firm* — Barley Snyder

(57) ABSTRACT

A cold shrinkable termination for an electric power cable that includes an insulation tube and stress control glue. When the cold shrinkable termination is mounted on the electric power cable, the stress control glue fills a gap between the electric power cable and the insulation tube so as to prevent local electric field concentration from occurring at an exposed end of the electric power cable. The stress control glue has a dielectric constant within a range of 5 to 100. In this cold shrinkable termination, a stress control glue with high dielectric constant is provided to optimize the electric-field distribution on an insulation surface of the electric power cable. Thereby, the structure of the cold shrinkable termination is simplified and the cost thereof is reduced. The cold shrinkable termination may be adapted to an electric power cable used to transmit voltage less than 26/35 kV.

8 Claims, 3 Drawing Sheets

(51) Int. Cl.
*H02G 1/14* (2006.01)
*H02G 15/04* (2006.01)
*H02G 15/068* (2006.01)

(58) Field of Classification Search
CPC .... H02G 15/04; H02G 15/068; H02G 15/046; H02G 15/1833; Y10T 29/49178; Y10T 428/31663; Y10T 428/256; Y10T 428/1372
USPC .............. 174/77 R, 73.1; 428/36.4, 328, 447
See application file for complete search history.

COLD SHRINKABLE TERMINATION, COLD SHRINKABLE TERMINATION ASSEMBLY AND METHOD FOR MANUFACTURING THE SAME

CROSS-REFERENCE TO RELATED APPLICATIONS

This application claims the benefit of Chinese Patent Application No. 201410372780.2 filed on Jul. 31, 2014 in the State Intellectual Property Office of China, the whole disclosure of which is incorporated herein by reference.

FIELD OF THE INVENTION

Embodiments of the present invention relate to a cold shrinkable termination, a cold shrinkable termination assembly for an electric cable, and a method of manufacturing the same.

BACKGROUND

Middle and low-voltage electric power cables, such as an electric power cable 200 transmitting voltages less than 26/35 kV (U0/U) as shown in FIG. 3, generally comprise: a conductor core 201, an insulation layer 202 covering the conductor core 201, a semi-conductive shield layer 203 covering the insulation layer 202, a metal shield layer 204 covering the semi-conductive shield layer 203, and an outer protection layer 205 covering the metal shield layer 204.

There are two types of cold shrinkable termination products for middle and low-voltage electric power cables in the prior art.

The first type of cold shrinkable termination product comprises an insulation tube and a layer of stress control glue and a stress control tube provided inside the insulation tube. When the cold shrinkable termination is mounted onto a processed or exposed end of the electric power cable, the stress control glue and the stress control tube is wrapped on the exposed semi-conductive shield layer and insulation layer of the electric power cable. In this way, local electric field concentration is prevented at the exposed ends of the electric power cable by the double layers of stress control material.

The second type of cold shrinkable termination product comprises a commonly used geometric stress control cone. When the cold shrinkable termination is mounted onto a processed or exposed end of the electric power cable, silicone oil or silicone grease should be used as a filling agent that fills a gap between the insulation tube of the cold shrinkable termination and the electric power cable. The use of silicone oil or silicone grease as the filling agent, however, is not acceptable in the some countries.

With regard to the first type of cold shrinkable termination product, since double layers of stress control material are used, the manufacturing cost is high and the structure is complicated.

With regard to the second type of cold shrinkable termination product, since the stress control cone and the silicone oil or silicone grease used as the filling agent are employed, similarly, there are the drawbacks of high manufacturing cost and complicated structure. In addition, this type of cold shrinkable termination product is not in conformity with corresponding technical regulations of certain countries, resulting in limited applications.

SUMMARY

The present invention has been made to overcome or alleviate at least one of the above-mentioned disadvantages.

Accordingly, it is an object of the present invention to provide a cold shrinkable termination for an electric power cable which has a simple structure and low-cost.

Accordingly, it is another object of the present invention to provide a cold shrinkable termination for an electric power cable which may meet relevant technical regulations of various countries.

In accordance with one aspect of the present invention, a cold shrinkable termination for an electric power cable includes an insulation tube and a stress control glue coated on an inner wall of the insulation tube. The electric power cable includes a conductor core having an exposed portion and an unexposed portion, an insulation layer having an exposed portion and an unexposed portion covering the unexposed portion of conductor core, a semi-conductive shield layer having an exposed portion and an unexposed portion covering the unexposed portion of the insulation layer, a metal shield layer having an exposed portion and an unexposed portion covering the unexposed portion of the semi-conductive shield layer, and an outer protection layer covering the unexposed portion of the metal shield layer. The insulation tube is sized to form a gap between the insulation tube and that portion of the electric power cable where the conductor core, the insulation layer, the conductive shield layer, and the metal shield layer of the electric power cable are exposed when the cold shrinkable termination is mounted on the electric power cable. The stress control glue fills the gap between the insulation tube and the exposed portions of the electric power cable when the cold shrinkable termination is mounted on the electric power cable.

In accordance with another aspect of the present invention, a cold shrinkable termination/electric power cable assembly includes an electric power cable that has a conductor core having an exposed portion and an unexposed portion, an insulation layer having an exposed portion and an unexposed portion covering the conductor core, a semi-conductive shield layer having an exposed portion and an unexposed portion covering the insulation layer, a metal shield layer having an exposed portion and an unexposed portion covering the semi-conductive shield layer, and an outer protection layer covering the unexposed portion of the metal shield layer. The cold shrinkable termination/electric power cable assembly also includes a cold shrinkable termination mounted on the electric power cable at the exposed portions of the electric power cable. The cold shrinkable termination has an insulation tube spaced from the exposed portions of the electrical power cable and a stress control glue in the space between the insulation tube and the selected portion of the electrical power cable.

In accordance with yet another aspect of the present invention, a method of manufacturing a cold shrinkable termination/electric power cable assembly includes the steps of:
  providing:
    electric power cable having an exposed end including:
      a conductor core having an exposed portion and an unexposed portion,
      an insulation layer having an exposed portion and an unexposed portion covering the unexposed portion of conductor core,
      a semi-conductive shield layer having an exposed portion and an unexposed portion covering the unexposed portion of the insulation layer,
      a metal shield layer having an exposed portion and an unexposed portion covering the unexposed portion of the semi-conductive shield layer, an outer protection layer covering the unexposed portion of the metal shield layer a cold shrinkable termination including:
an insulation tube,
a stress control glue, and,
a support tube;

coating the stress control glue along a selected segment of an inner wall of the insulation tube;

expanding the insulation tube of the cold shrinkable termination on the support tube;

inserting the exposed end of the electric power cable into the support tube, and removing the support tube from the insulation tube such that the insulation tube shrinks on the exposed end of the electric power cable.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EMBODIMENT(S)

Figure 1:
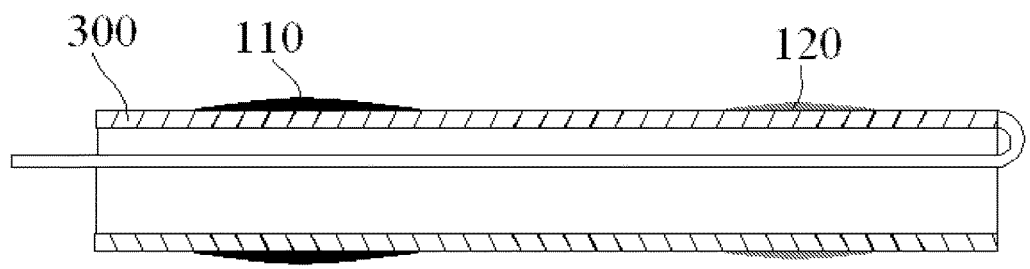
FIG. 1 is an illustrative view of a support tube according to an exemplary embodiment of the present invention, wherein a stress control glue and a sealing glue are pre-coated on selected segments of the support tube.

Exemplary embodiments of the present disclosure will be described hereinafter in detail with reference to the attached drawings, wherein the like reference numerals refer to like elements. The present disclosure may, however, be embodied in many different forms and should not be construed as being limited to the embodiment set forth herein; rather, these embodiments are provided so that the description of the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 3:
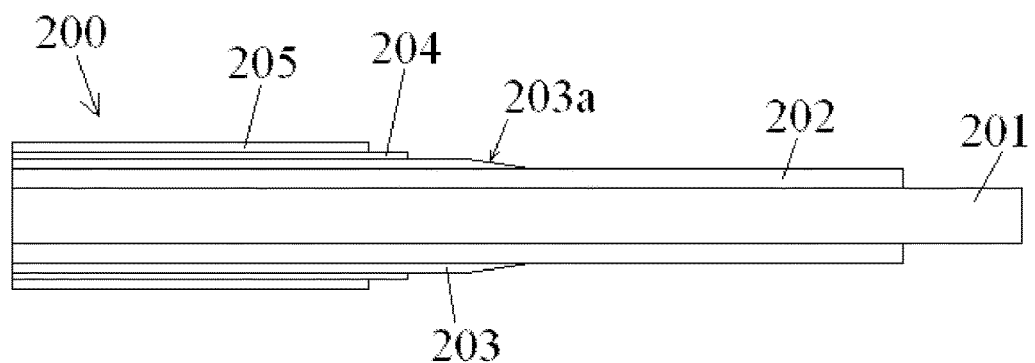
FIG. 3 is a illustrative view of a processed or exposed end of the to be connected electric power cable according to an exemplary embodiment of the present invention.

FIG. 3 is an illustrative view of a processed or exposed end of a to be connected electric power cable according to an exemplary embodiment of the present invention.

In an embodiment of the present invention, the electric power cable 200 may be an electric power cable used to transmit a voltage less than 26/35 kV (U0/U).

As shown in FIG. 3, in the illustrated embodiment, the electric power cable 200 comprises a conductor core 201, an insulation layer 202 covering the conductor core 201, a semi-conductive shield layer 203 covering the insulation layer 202, a metal shield layer 204 covering on the semi-conductive shield layer 203, and an outer protection layer 205 covering the metal shield layer 204. Thus, when the electric power cable 200 is to be connected, a segment of the outer protection layer 205 of the electric power cable 200 is first be removed so as to expose a segment of the metal shield layer 204, then a part of the exposed metal shield layer 204 is removed so as to expose a segment of the semi-conductive shield layer 203, then a part of the exposed semi-conductive shield layer 203 is removed so as to expose a segment of the insulation layer 202, and then a part of the exposed insulation layer 202 is removed so as to expose a segment of the conductor core 201. In this way, the end of the to be connected electric power cable 200 is processed or exposed as needed.

Figure 4:
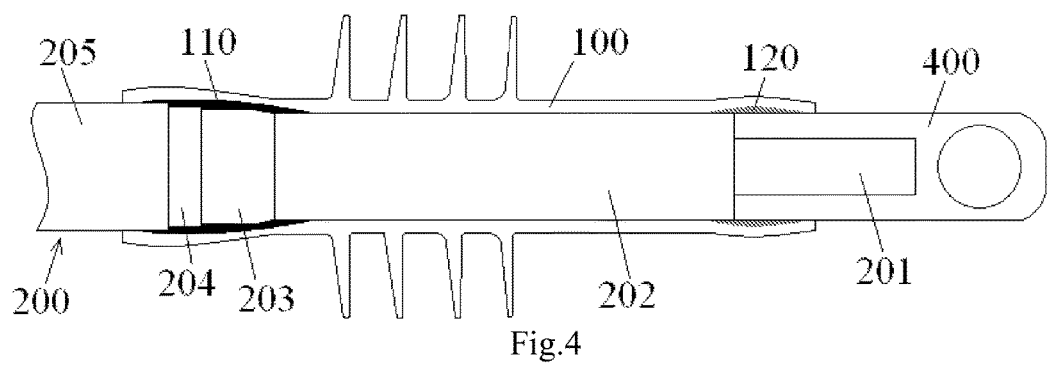
FIG. 4 is an illustrative view of a cold shrinkable termination assembly formed by mounting the cold shrinkable termination on the processed or exposed end of the electric power cable of FIG. 3.

FIG. 4 is an illustrative view of a cold shrinkable termination assembly formed by mounting the cold shrinkable termination on the processed or exposed end of the electric power cable 200 of FIG. 3.

As shown in FIG. 3 and FIG. 4, in an exemplary embodiment of the present invention, the cold shrinkable termination for the electric power cable 200 mainly comprises an insulation tube 100, a stress control glue 110 and a sealing glue 120.

As shown in FIG. 3 and FIG. 4, the insulation tube 100 has a first end (a left end in FIG. 4) and a second end (a right end in FIG. 4) opposite to the first end. The stress control glue 110 is provided on an inner wall of the insulation tube 100 near the first end. When the cold shrinkable termination is mounted on the processed or exposed end of the electric power cable 200, the stress control glue 110 fills a gap between the insulation tube 100 and the electric power cable 200 so as to prevent local electric field concentration from occurring at the end of the electric power cable 200.

In an exemplary embodiment of the present invention, in order to achieve a uniform electrical field at the exposed end of the electric power cable 200, a stress control glue 110 with high dielectric constant should be selected, such as a dielectric constant within the range of 5 to 100.

In another exemplary embodiment of the present invention, the stress control glue 110 may have a dielectric constant within the range of 10 to 65.

In another exemplary embodiment of the present invention, the stress control glue 110 may have a dielectric constant within the range of 15 to 30.

In another exemplary embodiment of the present invention, the dielectric constant of the stress control glue 110 may be selected as 10, 15, 20, 25, 30, 35 40, 45, 50, 55, 60, 65, 70, 75, 80, 85, 90, 95 and 100, or any number within the range of 5 to 100.

In an exemplary embodiment of the present invention, the hardness of the stress control glue 110 should be selected properly such that the stress control glue 110 may well fill in the gap between the insulation tube 100 of the cold shrinkable termination and the electric power cable 200, when the cold shrinkable termination is mounted on the processed or exposed end of the to be connected electric power cable 200. In this way, the local electrical field of the electric power cable 200 may be distributed uniformly, such that the electrical connection of the electric power cable 200 may meet the requirement of the electrical performance.

Figure 2:
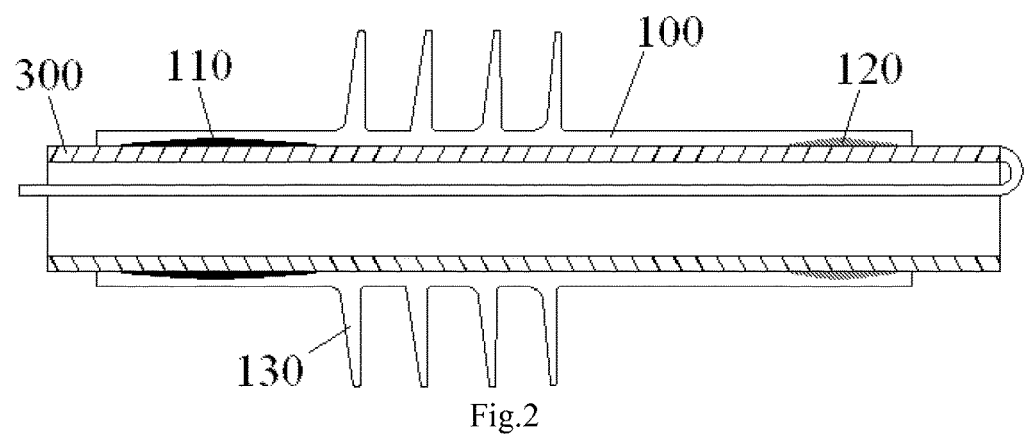
FIG. 2 is an illustrative view of expanding the insulation tube of a cold shrinkable termination on the support tube, on which the stress control glue and the sealing glue have been pre-coated.

FIG. 1 is an illustrative view of a support tube 300 according to an exemplary embodiment of the present invention, wherein the stress control glue 110 and sealing glue 120 are pre-coated on corresponding segments of the support tube 300. FIG. 2 is an illustrative view of expanding the insulation tube 100 of the cold shrinkable termination on the support tube 300, on which the stress control glue 110 and the sealing glue 120 have been pre-coated.

The steps of mounting the cold shrinkable termination on the processed or exposed end of the to be connected electric power cable 200 will be described hereinafter with reference to FIGS. 1, 2, 3 and 4.

First, as shown in FIG. 1, in an exemplary embodiment of the present invention, the stress control glue 110 is coated on a segment of the support tube 300 and the sealing glue 120 is coated on another segment of the support tube 300.

Then, as shown in FIG. 2, in an exemplary embodiment of the present invention, the insulation tube 100 of the cold shrinkable termination is expanded along the support tube 300, on which the stress control glue 110 and the sealing glue 120 have been pre-coated.

Then, the processed or exposed end of the electric power cable 200, as shown in FIG. 3, is inserted into the support tube 300 as shown in FIG. 2 and a metal connection terminal 400, as shown in FIG. 4, is press-connected to the conductor core 201 of the electric power cable 200 inserted therein.

Finally, the support tube 300 is removed from the insulation tube 100 of the cold shrinkable termination such that the insulation tube 100 shrinks onto the processed or exposed end of the electric power cable 200 and a cold shrinkable termination assembly as shown in FIG. 4 is formed.

Continuing to refer to FIG. 4, in the illustrated embodiment, the sealing glue 120 is provided on the inner wall of the insulation tube 100 near the second end. When the cold shrinkable termination is mounted on the electric power cable, the insulation tube 100 also shrinks onto the metal connection terminal 400 electrically connected to the exposed conductor core 201 of the electric power cable 200, so as to press the sealing glue 120 between the insulation tube 100 and the metal connection terminal 400 and, in turn, seal the engagement interface between the insulation tube 100 and the metal connection terminal 400.

In the embodiment as shown in FIGS. 1 to 4, the sealing glue 120 is pre-coated on the inner wall of the insulation tube 100 along the support tube 300 and is provided on the electric power cable 200 along with the insulation tube 100. The present invention, however, is not limited to the illustrated embodiments. The sealing glue 120 may also fill a gap between the insulation tube 100 and the metal connection terminal 400 after mounting the insulation tube 100 on the electric power cable 200.

In an embodiment of the present invention, as shown in FIG. 3, the metal shield layer 204 may comprise a copper wire shield layer or a copper strips shield layer.

As shown in FIG. 4, in an exemplary embodiment of the present invention, when the cold shrinkable termination is mounted on the electric power cable 200, the stress control glue 110 covers at least some of the whole exposed semi-conductive shield layer 203 of the electric power cable 200 and extends from the semi-conductive shield layer 203 to at least part of exposed insulation layer 202. In this way, it is possible to prevent local electric field concentration from occurring at cut-off end surface 203a of the semi-conductive shield layer 203.

In order to further make uniform the electrical field of the exposed end of the electric power cable 200, in another exemplary embodiment of the present invention, as shown in FIG. 4, when the cold shrinkable termination is mounted on the electric power cable 200, the stress control glue 110 extends from the semi-conductive shield layer 203 to at least part of exposed metal shield layer 204 of the electric power cable 200.

In order to further make uniform the electrical field of the exposed end of the electric power cable 200, in another exemplary embodiment of the present invention, as shown in FIG. 4, when the cold shrinkable termination is mounted on the electric power cable 200, the stress control glue 110 extends from the semi-conductive shield layer 203 to a part of exposed outer protection layer 205 of the electric power cable 200.

Figure 3A:
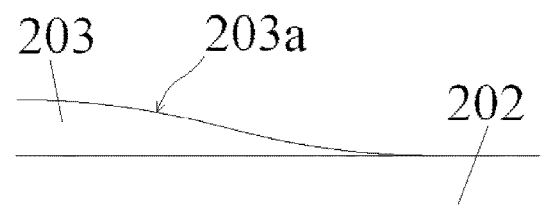
FIG. 3a is an enlarged illustrative view of an end surface of an exposed semi-conductive shield layer at the end of the electric power cable of FIG. 3.
Figure 3A:
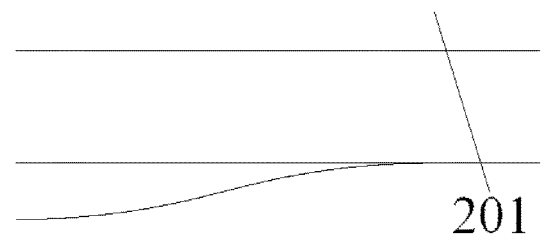

FIG. 3a is an enlarged view of an end surface 203a of exposed semi-conductive shield layer 203 at the end of the electric power cable 200 of FIG. 3.

As shown in FIG. 3 and FIG. 3a, in an exemplary embodiment of the present invention, the end surface of exposed semi-conductive shield layer 203 of the electric power cable 200 is processed (for example, polished) to be an inclined surface 203a relative to an outer surface of the exposed insulation layer 202, such that the thickness of the end surface 203a of the semi-conductive shield layer 203 gradually decreases to zero towards the exposed insulation layer 202. In this way, it is possible to further prevent local electric field concentration from occurring at the cut-off end surface 203a of the semi-conductive shield layer 203 and the electrical field distribution of the exposed end of the electric power cable 200 may be made even more uniform.

Figure 5:
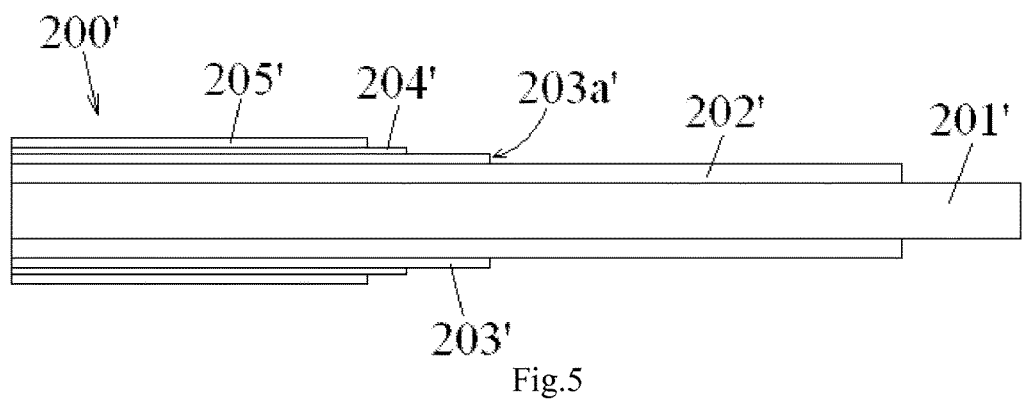
FIG. 5 is an illustrative view of a processed or exposed end of the to be connected electric power cable according to another exemplary embodiment of the present invention.

However, it should be noted that the present invention is not limited to the embodiment shown in FIG. 3 and FIG. 3a and the end surface of the semi-conductive shield layer may be directly cut off to be perpendicular to the outer surface of the exposed insulation layer, which is much simpler in manufacturing the product. For example, FIG. 5 is an illustrative view of a processed or exposed end of the electric power cable according to another exemplary embodiment of the present invention. In the embodiment of FIG. 5, the end surface of the exposed semi-conductive shield layer 203' of the electric power cable 200' is directly cut off to be a vertical surface perpendicular to the outer surface of the exposed insulation layer 202'.

As shown in FIG. 2, in the illustrated embodiment, an outer wall of the insulation tube 100 may be formed with a plurality of skirts 130 projecting outward so as to increase the creepage distance of the insulation tube 100.

In the various embodiments of the cold shrinkable termination of the present invention, only a layer of stress control glue with high dielectric constant is provided to optimize the electric-field distribution on the insulation surface of the electric power cable and to prevent the local electric field concentration from occurring at the end of the electric power cable, without providing a stress control tube and a stress control cone. Thereby, the structure of the cold shrinkable termination is simplified and the cost thereof is decreased. Furthermore, when the cold shrinkable termination is mounted on the electric power cable, there is no need of silicone oil or silicone grease. Thus, the cold shrinkable termination may meet relevant technical regulations of various countries and has a wide market.

It should be appreciated by those skilled in this art that the above embodiments are intended to be illustrative and not restrictive. For example, many modifications may be made to the above embodiments by those skilled in this art and various features described in different embodiments may be freely combined with each other without conflicting in configuration or principle.

Although the present disclosure has been described with reference to the attached drawings, the embodiments disclosed in the attached drawings are intended to describe the preferred embodiments of the present invention as exemplary rather than limited to the present disclosure.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, the terms "comprising" and "having" should be understood as not excluding other elements or steps, and term "a" and "an" should be understood as not excluding plurals of the elements or steps.

What is claimed is:

1. A cold shrinkable termination for an electric power cable:
   (a) the electric power cable having:
      (1) a conductor core having an exposed segment and an unexposed segment,
      (2) an insulation layer having an exposed segment and an unexposed segment covering the unexposed segment of conductor core,
      (3) a semi-conductive shield layer having an exposed segment and an unexposed segment covering the unexposed segment of the insulation layer,
      (4) a metal shield layer having an exposed segment and an unexposed segment covering the unexposed segment of the semi-conductive shield layer, and
      (5) an outer protection layer covering the unexposed segment of the metal shield layer, and
   (b) the cold shrinkable termination
      (1) comprising:
         (i) an insulation tube sized to form a gap between the insulation tube and that segment of the electric power cable where the conductor core, the insulation layer, the semi-conductive shield layer, and the metal shield layer of the electric power cable are exposed when the cold shrinkable termination is mounted on the electric power cable, and
         (ii) a stress control glue coated on an inner wall of the insulation tube, the stress control glue having a dielectric constant within a range of 5 to 100, and
      (2) adapted to position the stress control glue at the gap between the insulation tube and the exposed segment of the electric power cable when the cold shrinkable termination is mounted on the electric power cable.

2. The cold shrinkable termination according to claim 1, wherein, the dielectric constant of the stress control glue is selected within a range of 10 to 65.

3. The cold shrinkable termination according to claim 1, wherein, the dielectric constant of the stress control glue is selected within a range of 15 to 30.

4. A cold shrinkable termination/electric power cable assembly comprising:
   an electric power cable including:
      (a) a conductor core having an exposed segment and an unexposed segment,
      (b) an insulation layer having an exposed segment and an unexposed segment covering the conductor core,
      (c) a semi-conductive shield layer having an exposed segment and an unexposed segment covering the insulation layer,
      (d) a metal shield layer having an exposed segment and an unexposed segment covering the semi-conductive shield layer, and
      (e) an outer protection layer covering the unexposed segment of the metal shield layer; and
   a cold shrinkable termination mounted on the electric power cable at the exposed segments of the electric power cable and having:
      (a) an insulation tube spaced from the exposed segments of the semi-conductive shield layer and the metal shield layer, and
      (b) a stress control glue in the space between the insulation tube and the exposed segments of the semi-conductive shield layer and the metal shield layer, the stress control glue having a dielectric constant within a range of 5 to 100.

5. A cold shrinkable termination/electric power cable assembly according to claim 4, further comprising a metal connection terminal electrically connected to the conductor core of the electric power cable.

6. A cold shrinkable termination/electric power cable assembly according to claim 5 wherein an end surface of the exposed semi-conductive shield layer of the electric power cable is inclined relative to the exposed insulation layer with the thickness of the end surface of the exposed semi-conductive shield layer gradually decreasing to zero toward the exposed insulation layer.

7. A cold shrinkable termination/electric power cable assembly according to claim 6 wherein an end surface of the exposed semi-conductive shield layer of the electric power cable is perpendicular to the exposed insulation layer.

8. A cold shrinkable termination/electric power cable assembly according to claim 7 further comprising a sealing glue between the insulation tube and the metal connection terminal.

* * * * *